Figure 11:
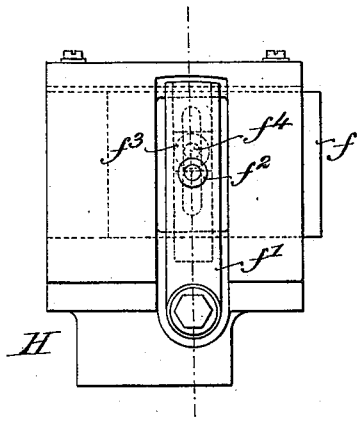

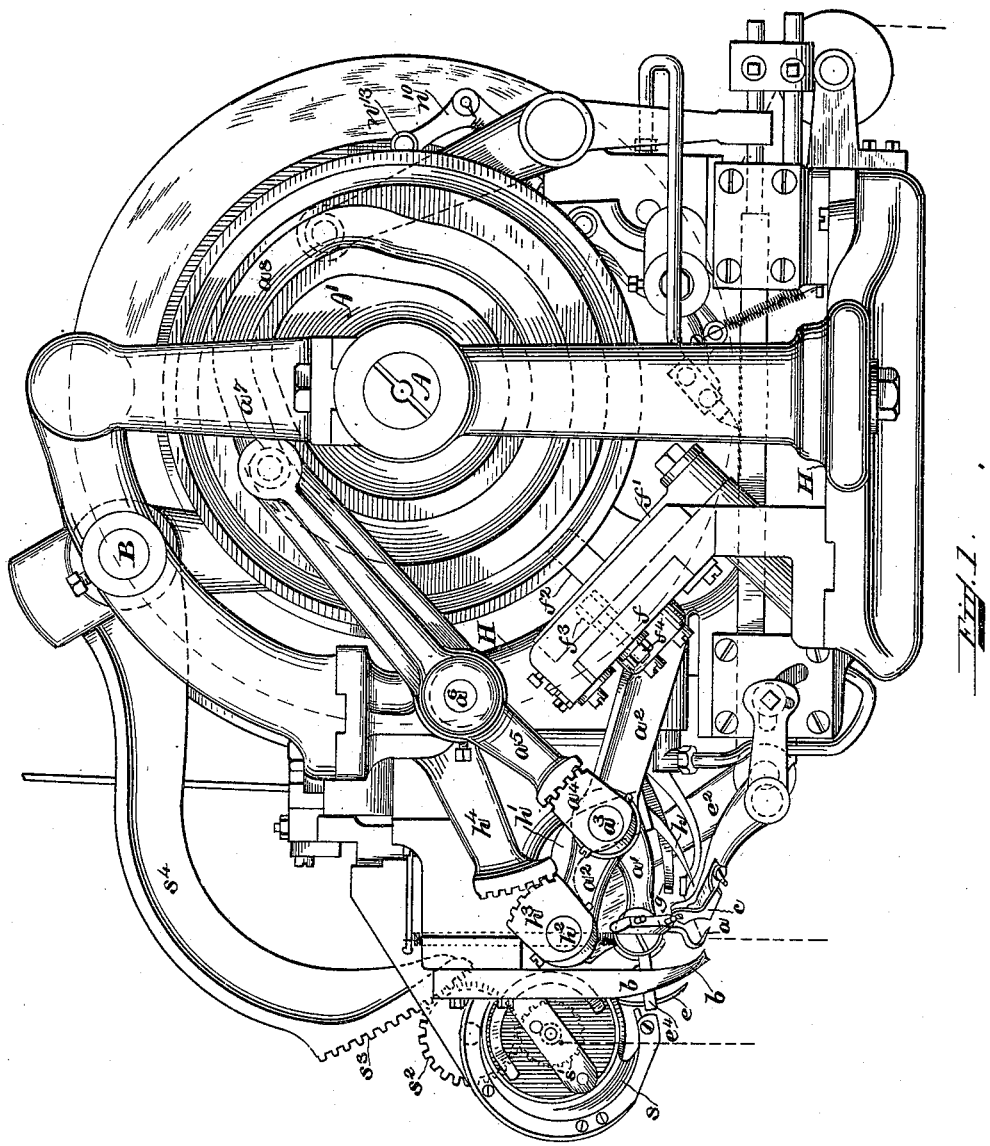

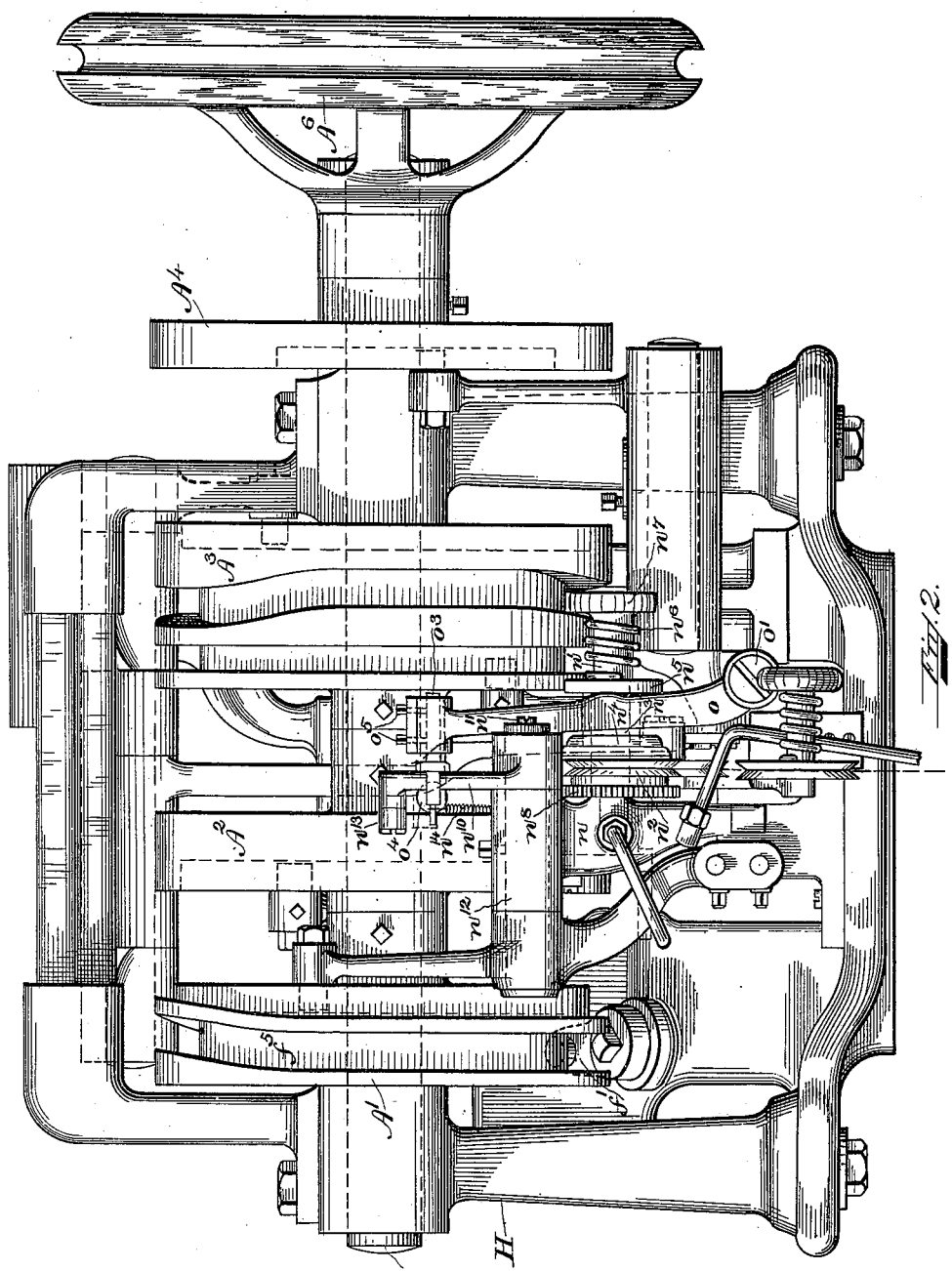

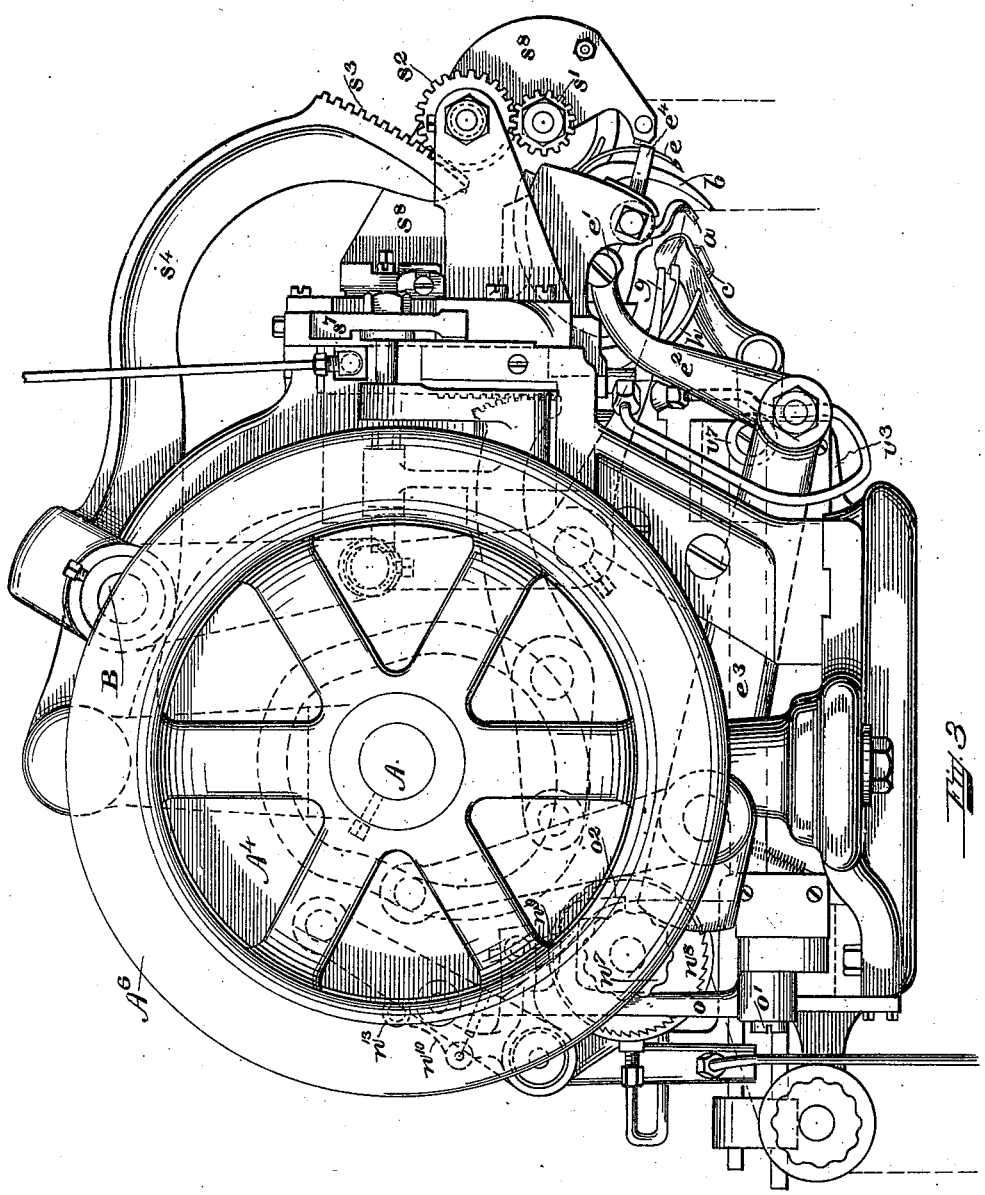

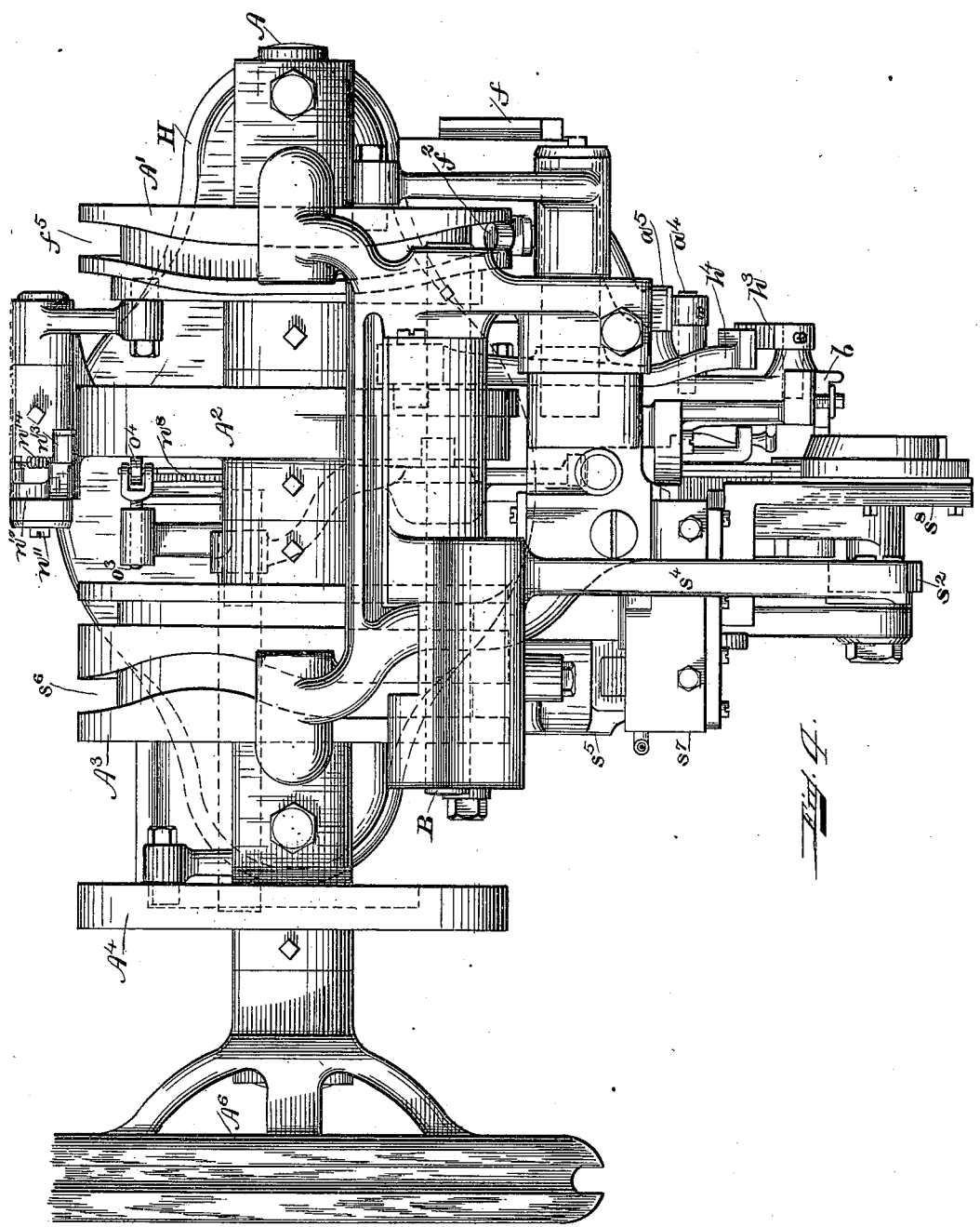

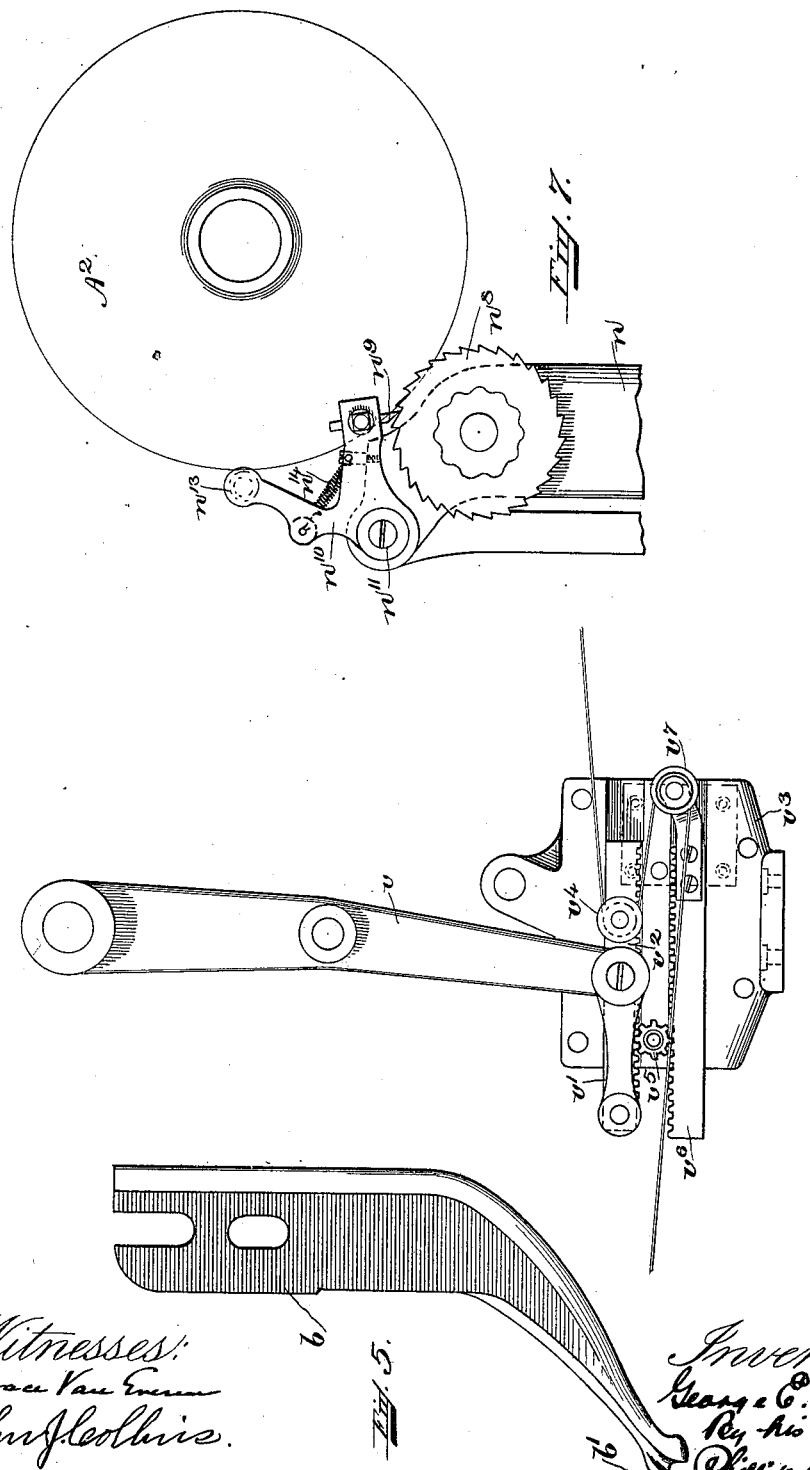

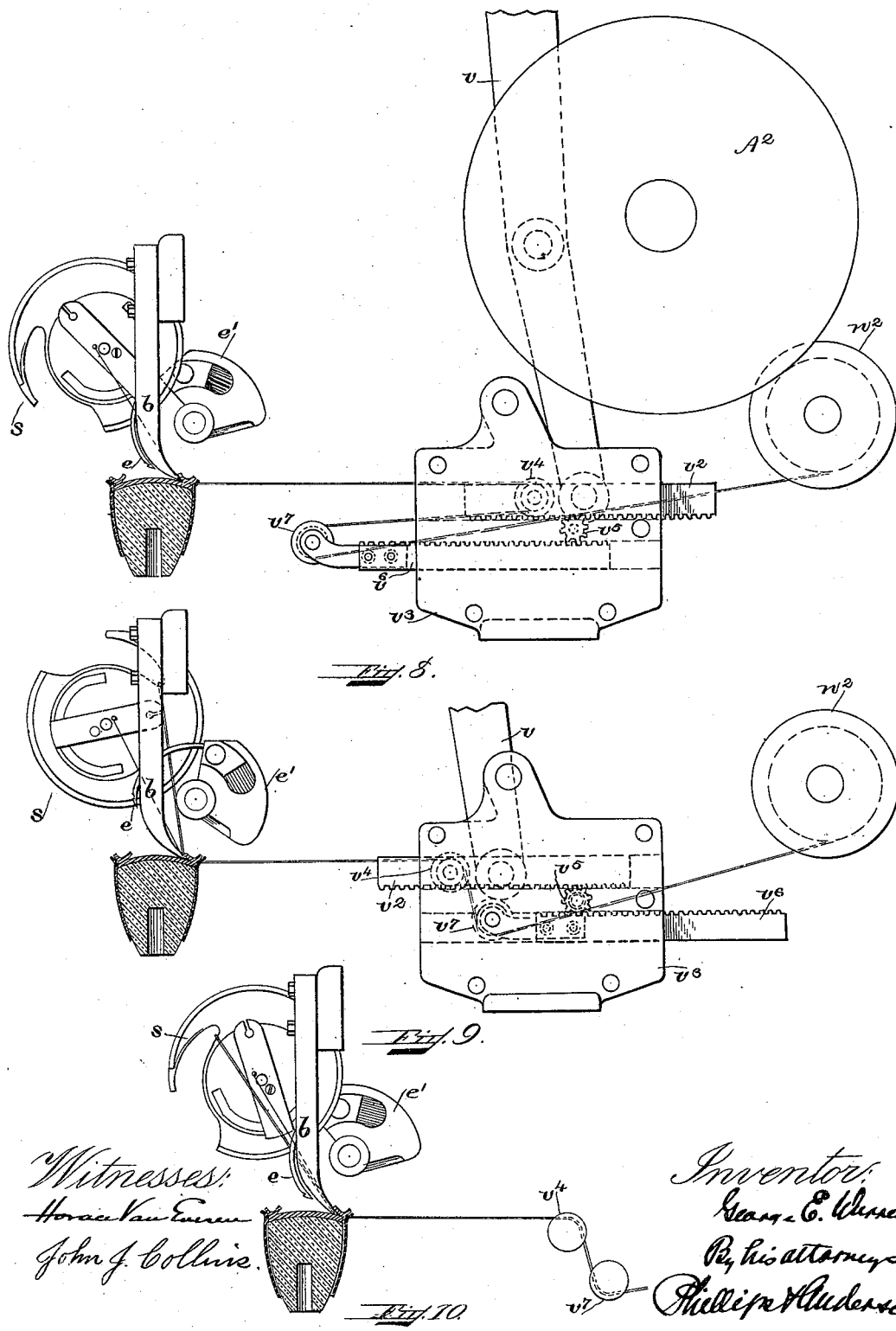

No. 665,376. Patented Jan. 1, 1901.
G. E. WARREN.
SHOE SEWING MACHINE.
(Application filed Apr. 26, 1898.)
(No Model.) 7 Sheets—Sheet 7.

UNITED STATES PATENT OFFICE.

GEORGE E. WARREN, OF BOSTON, MASSACHUSETTS, ASSIGNOR TO THE UNITED SHOE MACHINERY COMPANY, OF PATERSON, NEW JERSEY.

SHOE-SEWING MACHINE.

SPECIFICATION forming part of Letters Patent No. 665,376, dated January 1, 1901.

Application filed April 26, 1898. Serial No. 678,900. (No model.)

*To all whom it may concern:*

Be it known that I, GEORGE E. WARREN, a citizen of the United States, residing at Boston, in the county of Suffolk and State of Massachusetts, have invented certain new and useful Improvements in Shoe-Sewing Machines; and I do hereby declare the following to be a full, clear, and exact description of the invention, such as will enable others skilled in the art to which it appertains to make and use the same.

The present invention relates generally to improvements in lock-stitch sewing-machines, and more particularly to such types of lock-stitch machines as are adapted to stitch the welt to the lasted upper and insole of a welted boot or shoe or the upper to the outsole of a turn boot or shoe, the former type of machines being known in the trade as "welt-sewing" machines and the latter type as a "turn-sewing" machine.

In attempting to adapt lock-stitch mechanism to the peculiar conditions to which a welt or turn sewing machine must be adapted great difficulty has been experienced in securing a tight seam, and in so far as I am advised of the art of manufacturing shoes, while the outsole is now almost universally stitched to the welt by means of lock-stitch mechanism chain-stitch machines are generally if not universally used to secure the welt to the lasted upper and insole in a welted shoe and the upper to the outsole in a turn shoe.

It is well known to persons skilled in the art that to form a satisfactory lock-stitch inseam in a welted shoe or lock-stitch seam in a turn shoe it is necessary that the upper and welt in the former type of shoe should be drawn tightly together and firmly against the between substances and that the lock should be positioned in the between substances near the base of the channel. In the case of a turn shoe the upper must be drawn firmly against the between substances and the lock similarly positioned.

In most forms of lock-stitch welt or turn machines proposed in the prior art and known to me the needle enters from the welt side of the work, penetrating the welt first and then the upper and between substances and emerging into the channel. Lock-stitch turn-sewing machines have also, so far as I am at present advised of the art, been commonly similarly arranged, the needle entering from the upper side of the work first piercing the upper and then the between substances and emerging in the channel.

It is evident that in a machine involving the arrangement of stitch-forming mechanism above suggested the bight of shuttle-thread must be drawn by the supply-thread through the welt and upper in the case of a welted shoe and through the upper in the case of a turn shoe into and almost through the between substances to properly position the lock, and that while so drawn the lock or bight of the supply-thread renders through the bight of the shuttle-thread with which it is engaged, and the bight of shuttle-thread renders more or less through the bight of the supply thread, a feature which, as is well known to persons skilled in the art, materially impedes the successful operation of the machine, it being a well-known fact that the rendering of thread about thread is to be avoided in all types of sewing-machines, particularly in those in which a wax-thread is used. It will be further noted that in sewing with machines of this class the amount of the supply-thread used in making a stitch as compared with the amount of shuttle-thread is relatively small. In making a stitch of average length in stock of average thickness the amount of supply-thread used in practice is a little more than one-fourth the amount of the shuttle-thread. This feature besides occasioning more or less inconvenience, owing to the frequent necessity of renewing the bobbin, subjects the supply-thread to an undue abrasion and wear, which tends to materially weaken the same, so that if a heavy tension is run, such as is required to secure a tight seam in many kinds of stock, the machine will break the thread frequently, causing great delay and inconvenience and rendering the work insecure and imperfect. The wear upon the supply-thread referred to will be perhaps better understood by taking into consideration the fact that in machines arranged as above stated every portion of the supply-thread must be drawn back and forth through the material many times—in practice twenty to thirty times—before it is brought to its final position in the seam.

I am aware that the objections above noted have been partially obviated by arranging the needle to enter the work from the channel side, thus increasing the amount of supply-thread entering into such stitch; but in such machines as heretofore constructed and known to me the take-up is relied upon entirely to set the stitch, and the pull of the thread while setting the stitch, being by this arrangement brought against the between substance, tends to spread the "seam," as it is commonly termed, particularly when the insole is soft or spongy.

In the present invention I have arranged the needle to enter the work from the channel side, thus increasing the amount of supply-thread used in a given stitch, practically reversing the proportions of shuttle and supply thread, as before stated. I have also so timed and arranged the take-up and shuttle that the supply-thread is drawn up by the take-up to bring the bight of shuttle-thread into the channel, and said bight is drawn into the between substances and the stitch given its final set by the shuttle. I have also provided a tension-controlling device which releases the tension during a portion of the thread-pulling operation of the shuttle, so that it can draw freely from the supply end, and restores the tension before the shuttle has completed its pull, enabling the shuttle to set the stitch and accurately position the lock. It will be noted that by arranging the shuttle to set the stitch and the needle to enter from the channel side of the work I secure the advantage not only of using a relatively large amount of supply-thread, but also of having the final pull, which sets the stitch, brought against the welt, and thereby bringing the welt and upper tightly together and firmly against the between substances. I have also provided a thread-hook arranged to control the direction of the pull of the thread from the between substances and a novel arrangement of the awl, which has no lateral movement except when out of the material.

The present invention therefore consists of the features above set forth and their combination with each other and with associated parts of a lock-stitch sewing-machine, as hereinafter more fully described in this specification, and defined in the claims.

A preferred form of the present invention is illustrated in the accompanying drawings, in which—

Figure 12:
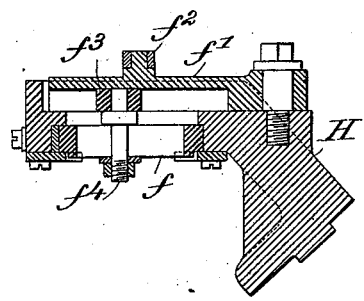

Figure 1 is a side view looking toward the left of a lock-stitch welt-machine embodying the same. Fig. 2 is a rear elevation. Fig. 3 is a side elevation looking toward the right. Fig. 4 is a top plan view. Fig. 5 is a detached view of channel-guide, showing the thread-hook for controlling the direction of the pull of the thread from between substances. Fig. 6 is a partial side elevation illustrating the take-up mechanism. Fig. 7 is a detail of tension locking device. Figs. 8, 9, and 10 are diagrammatic views illustrating the formation of the stitch. Figs. 11 and 12 are details hereinafter referred to.

Referring to the drawings, H represents a frame suitable to support the working parts of the machine and which may be conveniently mounted upon a suitable pedestal, (not shown,) as usual in this class of machines. In suitable bearings in the frame H is mounted the main shaft A of the machine, driven by a suitable pulley $A^6$ and carrying the cam-disks $A'$ $A^2$ $A^3$ $A^4$, upon which are formed suitable cams for actuating the several parts, as hereinafter described.

The machine of the drawings comprises a needle $e$, mounted in a needle-segment $e'$, and actuated by the cam $A^4$, by means of the lever $e^3$ and connecting-link $e^2$, the arrangement being the usual arrangement in this class of machines and forming no part of the present invention. In connection with the needle is provided a needle-guide $e^4$, which is of the usual form, mounted to oscillate concentrically with the needle-segment and kept in proper relation to the needle by the usual mechanism. (Not fully illustrated in the drawings, for the reason that the same is well known to any one of average skill in the art.) Said machine also comprises a feed-point, (shown at $a$,) which is mounted upon a swinging arm $a'$, secured to the stud $a^3$, mounted to rotate in suitable bearings in a bracket $a^2$, projected from the feed-slide $f$. To the stud $a^3$ is secured a segmental gear $a^4$, which meshes with a segmental gear on the lever $a^5$, fulcrumed on a stud $a^6$, supported by a fixed part of frame H and carrying on its rear end a cam-roll $a^7$, engaging a cam-groove $a^8$ in the side face of the disk $A'$. The feed-point thus is given a lateral movement with the feed-slide and a movement toward and from the work, the arrangement being substantially similar in mode of operation to that shown in Letters Patent No. 545,625, issued to Fowler and Warren September 3, 1895, and in itself forms no part of the present invention.

The shuttle is shown at $s$ and is arranged to have an oscillating movement and a lateral or sidewise movement, being actuated in its oscillating movement by a suitable shuttle-driver actuated by the gear $s'$, which meshes with the gear $s^2$, which in turn meshes with the segmental gear $s^3$, carried by the swinging lever $s^4$, which is actuated by a groove in side face of the cam-disk $A^3$. The sidewise movement above referred to is imparted to the shuttle by means of a lever $s^5$, which is actuated by the peripheral cam-groove $s^6$ in the disk $A^3$ and actuates a slide $s^7$, from which projects the bracket $s^8$, in which is formed the shuttle-race, the position of the slide $s^7$ and form and arrangement of the bracket $s^8$ being such that the shuttle $s$ is brought on the channel side of the work and in proper correlation to the needle which enters from such side. I desire to say in this connection that with slight changes in form and arrangement of details required by changed position of the shuttle the shuttle-actuating mechanism above referred to is substantially similar to that shown and described in Letters Patent No. 583,522, granted to me June 1, 1897, and in view of such disclosure it is thought that a further description thereof is unnecessary herein. I desire, further, to say that the details of construction of said shuttle and its mode of operation in taking the loop from the needle without the intervention of a spreader are substantially the same as in said patented machine. The shuttle, however, has an important function in my present machine due to its changed position and correlation in operation to other parts which it does not have in my said patented machine and which will be hereinafter more fully described.

The awl in my present machine is represented at $h$, and while it is mounted upon an extension of the bracket $a^2$ and is moved laterally with the feed-slide $f$ has no feeding functions, acting simply as a puncturing instrument, its lateral movement being timed to occur while the awl is clear of the material.

As shown, the awl $h$ is mounted upon a swinging lever $h'$, mounted upon a stud $h^2$, having suitable bearings in a forward extension of the bracket $a^2$, which, as before stated, is projected from the slide $f$. The stud $h^2$ carries a segmental gear $h^3$, which meshes with a segmental gear formed upon the lever $h^4$, intermediately fulcrumed on the stud $a^6$, hereinbefore referred to, and actuated by a cam-groove in the side face of the disk $A^2$. The feed-slide $f$ is actuated by a lever $f'$, fulcrumed at its lower end upon the frame H, and in the front of which is formed a longitudinal slot (see dotted lines, Fig. 1) which is engaged by a block $f^3$ on the slide $f$. The block $f^3$ is secured to said slide, preferably, by means of a bolt $f^4$, which projects through a slot or elongated port-hole in said slide and by means of which the block $f^3$ may be moved toward or away from the fulcrum of the lever $f'$ to vary the length of movement of the slide $f$. The lever $f'$ carries a truck or cam-roll $f^2$, which engages a peripheral cam-path $f^5$ in the disk A′. The parts thus described are shown in detail in Figs. 11 and 12.

The machine of the drawings also embodies a thread-finger or thread-arm $g$ and suitable mechanism for actuating the same; but I desire to say that such parts and their correlative functions are so well known in the prior art (see, for example, patent to D. H. Campbell, No. 253,156) that further description thereof and of their actuating mechanism is regarded as unnecessary herein, said parts being employed in the machine of the drawings to perform their usual functions in the usual manner and forming no part of the present invention.

The machine of the drawings also embodies a take-up mechanism, (illustrated in detail in Fig. 6,) which, however, is, broadly speaking, the compound take-up of the prior art and for which of itself I make no claim of invention. The specific form illustrated comprises a swing-lever $v$, dependent from a shaft B, intermediately carrying a cam-roll $v^{30}$, which engages a cam-path (not shown) in the side face of the disk A′. The lower end of lever $v$ is connected by a link $v'$ with a sliding rack $v^2$, mounted to reciprocate longitudinally in a suitable guideway in the frame H or in a box or bracket $v^3$, secured thereto. The rack $v^2$ carries a thread-truck $v^4$ and meshes with a gear $v^5$, which is mounted on the box or bracket $v^3$ and meshes with a rack $v^6$, also mounted and free to reciprocate in a guideway in the box or bracket $v^3$. The rack $v^6$ carries a thread-truck $v^7$, and the arrangement is such that a swinging motion of the lever $v$ advances one truck and retracts the other. The lead of the thread is from the tension over the front of truck $v^7$ and the back of truck $v^4$ and thence forward to the looper.

The tension mechanism illustrated in the drawings is described as follows: In an upright $n$, forming part of the frame H at the back of machine, is fixed a short horizontal shaft or stud $n'$, upon which is loosely mounted the thread-truck $n^2$, around which the supply-thread leads from the wax-pot to the take-up. Upon the stud $n$ is mounted a sleeve $n^3$, which is free to slide along the stud $n'$ and carries at opposite ends the disks $n^4$ and $n^5$, the disk $n^4$ being faced with felt or suitable material and arranged to bear against the side face of the thread-truck $n^2$ to control its rotation. The disk $n^4$ is normally forced against the truck $n^2$ by a coiled spring $n^6$, which is coiled about the stud $n'$ and bears at one end against the disk $n^5$ and at its opposite end against an adjusting-nut $n^7$, threaded upon the end of the stud $n'$. In the machine of the drawings the thread-truck $n^2$ is arranged to be positively locked from rotation during the operation of the take-up, and provision is made to relieve the same from the pressure of the friction-disk $n^4$ while the shuttle is performing the entire portion of its thread-pulling movement to allow the thread to run freely from the supply side, the disk $n^4$ being thereafter and before the shuttle has completed its thread-pulling movement allowed to engage the truck $n^2$ under the normal pressure of the spring $n^6$. The mechanism for positively locking the truck $n^2$ consists of a ratchet-disk $n^8$, carried by the truck $n^2$, which is engaged by a pawl $n^9$, carried by one arm of bell-crank lever $n^{10}$, fulcrumed at $n^{11}$ upon a stud $n^{12}$, carried in a bearing upon the upright $n$. The opposite end of the bell-crank lever carrying a cam-roll $n^{13}$ is normally held in contact with the periphery of the cam-disk $A^2$ by a suitable spring $n^{14}$, one end of which is secured to the bell-crank $n^{10}$ and the other to a fixed part of the frame H. The periphery-cam on the disk A², above referred to, is so formed that the pawl $n^9$ is held out of engagement with the ratchet-disk $n^8$ except while the take-up is acting, and during the operation of the take-up the pawl $n^9$ is brought into engagement with the ratchet-disk $n^8$ and positively restrains the truck $n^2$ from rotation, thereby practically preventing any drawing off or "stealing" of the supply-thread by the take-up.

The mechanism for releasing the tension is described as follows: A lever $o$ is fulcrumed at its lower end at $o'$ on a fixed portion of the frame H and above its fulcrum carries a yoke $o^2$, (see dotted lines in Fig. 3,) which embraces the sleeve $n^3$ between the disks $n^4$ and $n^5$, the yoke $o^2$ and sleeve $n^3$ having squared bearing-surfaces which prevent any rotation of the sleeve and disks. The lever $o$ is provided at its upper end with a sleeve which receives the stem or shank $o^3$ of a roll-carrier, in which is mounted the cam-roll $o^4$, which is held in contact with a cam formed on the side of the disk A² by means of the spring $n^6$, which bears against the disk $n^5$, as before described. The stem $o^3$ of the roll-carrier is adjustably held in the sleeve at the upper end of lever $o$ by means of the set-screws $o^5$. The cam against which the roll $o^4$ bears, as above stated, is so timed that while the shuttle is accomplishing the earlier portion of its loop-drawing movement, before referred to as "thread-pulling" movement, the lever $o$ is actuated to force the sleeve $n^3$ away from the thread-truck $n^2$, relieving the pressure of the friction-disk $n^4$ thereon and allowing the thread to run freely from the supply end until the shuttle has reached a point in its thread-pulling movement at which the rest of such movement is sufficient to properly position the lock and set the stitch, at which time the lever $o$ is released and the spring $n^6$ allowed to force the friction-disk $n^4$ against the side face of the truck $n^2$ to again put the supply-thread under tension.

The welt-guide or back-gage is shown at $c$ and may be, and conveniently is, together with its actuating mechanism, substantially similar to that disclosed in patent to Fowler and Warren, No. 560,705, dated May 26, 1896, and further description thereof is regarded as unnecessary herein.

The machine of the drawings is also provided with a channel-guide $b$, which, as shown, is secured to a fixed portion of the frame H in such position that its lower or working end will properly engage the channel in the insole to guide the work to the stitch-forming mechanisms. The channel-guide $b$ (see Fig. 5) is provided with a thread-hook $b'$, which, as shown, is located near the working end of said guide, on the needle side of said guide, and projected toward the needle. The function of the thread-hook $b'$ is to engage the thread as it leads from the work to the hook of the shuttle and to control the direction of the pull of the supply-thread while drawn by the shuttle and prevent it from lifting on the between substances, as hereinafter described, and I desire to say that I consider such device, however formed and wherever located, provided it performs the function above stated, to be clearly within the scope of the present invention.

The formation of the stitch by the mechanisms hereinbefore described in so far as the same involves any novel features is described as follows: The needle enters the work from the channel side, and when it has reached its advanced position the looper acts to throw a bight of the supply-thread into the hook of the needle, which retracts to draw said loop through the material, the thread-arm giving up its thread to the retracting-needle in the usual manner. While the needle is being retracted, the shuttle is moved toward the plane of oscillation of the needle, and when the needle has reached its retracted position, completing its loop-drawing movement, the hook of the shuttle engages the loop of thread drawn up by the needle, substantially as described in my said Patent No. 583,522, and such loop is thrown over the shuttle by the oscillation thereof (the tension release operating as hereinafter described) and engages a bight of shuttle-thread to form the lock. During the formation of the first stitch the shuttle can exert no stitch forming or setting pulls on the needle-thread, because there is no previous stitch. As soon as the bight of supply-thread has reached a position to be drawn off the shuttle the take-up commences to act, the thread being at this time held at the supply end by the positively-locked thread-truck of the tension device and draws down the loop of supply-thread until the lock is brought into the channel, but not into its final position in the between substances, the thread being in substantially the position indicated in Fig. 8. The needle then again pierces the material and is retracted, bringing up another loop of the supply-thread, which is engaged by the hook of the shuttle, as before described. The shuttle then commences to oscillate, and as its hook carrying the loop of supply-thread is turned away from the between substances draws out said loop, the tension having been released, as before described, during the earlier portion of such thread-pulling movement to allow the thread to draw off freely from the supply end, and when the shuttle in its oscillation has reached substantially the position shown in Fig. 9, the loop of thread at this time having been drawn out to nearly a sufficient length to pass around the shuttle, the tension is restored and the remaining pull of the shuttle upon the supply-thread acts to draw the lock into position in the between substances and to finally set the stitch.

It will be further noted in connection with the foregoing description that while the loop of supply-thread is being drawn up by the shuttle to set the stitch, as before described, said loop is engaged by the thread-hook and the line of pull deflected, so as to be substantially parallel with the face of the sole, thereby preventing the thread from what is commonly termed "lifting" on the between substances—in other words, exerting a pull which tends to tear up the between substances from the sole. The operation of the awl has already been sufficiently described, its function being simply to puncture the work for the passage of the needle.

The awl is mounted upon the feed-slide and given its lateral movement for the purpose of removing it at times from the path of movement of other parts of the machine. The construction and timing of the several cams and the construction and arrangement of the intermediate connections whereby several of the operating parts are actuated by said cams have not been herein fully illustrated or described; but all such omissions can be readily supplied by a mechanic of average skill in the art, who without the exercise of more than ordinary skill could readily construct and operate a machine embodying the present invention.

Having thus described my invention and its mode of operation, I claim as new and desire to secure by Letters Patent of the United States—

1. A lock-stitch shoe-sewing machine, having, in combination, a needle, a looper, their actuating mechanism, a shuttle, means to impart to the shuttle a thread-pulling movement, a tension device, and mechanism controlling the tension device timed and arranged to release the tension during the first part of the thread-pulling movement of the shuttle, and to restore the tension before the shuttle completes its thread-pulling movement, substantially as described.

2. A lock-stitch shoe-sewing machine, having, in combination, a needle, a looper, their actuating mechanism, a shuttle, means to impart to the shuttle a thread-pulling movement, and a thread-hook located to engage the loop of thread between the shuttle and the work and adjacent to the surface of the work, while said loop is being pulled by the shuttle, to deflect the direction of the strain exerted through said loop on the work, substantially as described.

3. A lock-stitch shoe-sewing machine, having, in combination, a needle, a looper, their actuating mechanism, a shuttle, means to impart to the shuttle a thread-pulling movement, and a channel-guide provided near its end with a projecting thread-hook for engaging the loop of thread being pulled by the shuttle to deflect the direction of the strain exerted through said loop on the work, substantially as described.

4. A shoe-sewing machine, having, in combination, stitch-forming mechanism comprising stitch-setting means and a thread-hook located to engage the thread between the stitch-setting means and the work, and adjacent to the surface of the work to deflect the direction of the strain exerted by the thread on the work, substantially as described.

5. A shoe-sewing machine, having, in combination, a needle, and its carrier movable in a fixed plane, a puncturing-awl mounted on an independent carrier, means to actuate the awl-carrier to impart to the awl work-puncturing movements in the plane of movement of the needle and to move it laterally into and out of said plane of movement, while withdrawn from the work, substantially as described.

In testimony whereof I affix my signature in presence of two witnesses.

GEORGE E. WARREN.

Witnesses:
T. HART ANDERSON,
HORACE VAN EVEREN.